(No Model.) 2 Sheets—Sheet 1.
W. SHAKESPEARE, Jr. & G. W. LOW.
PHOTOGRAPHIC CAMERA SHUTTER.
No. 495,066. Patented Apr. 11, 1893.
Fig. 1.
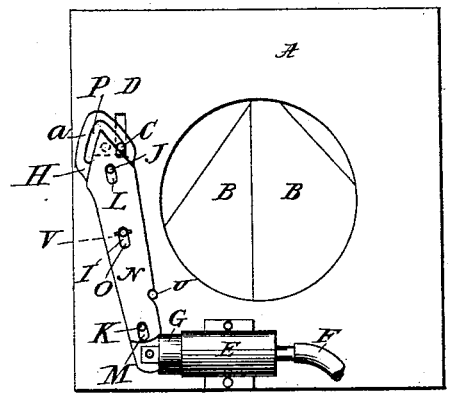
Fig. 2.
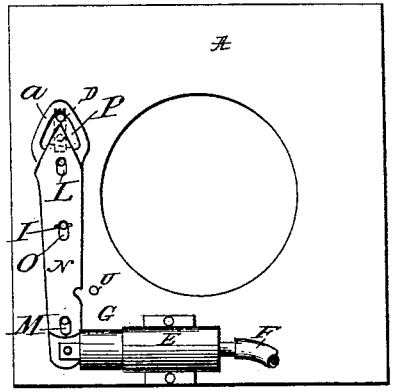
Fig. 3.
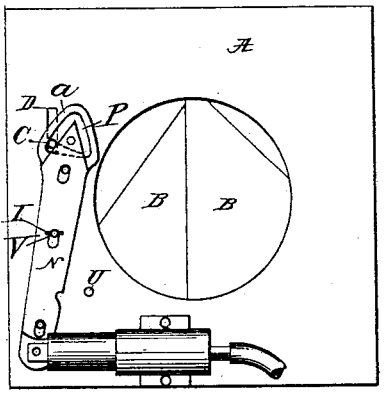
Fig. 4.
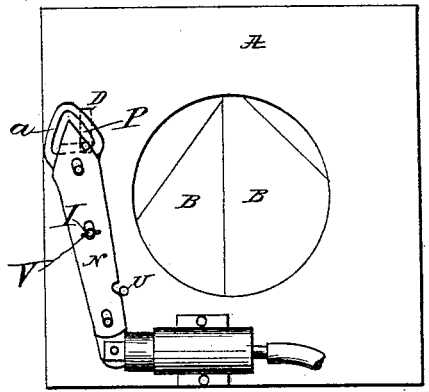
Fig. 5.
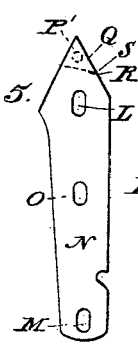
Fig. 6.
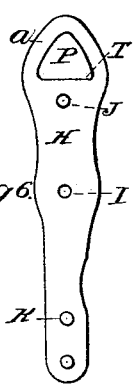
Fig. 7.
WITNESSES:
Edward C. Rowland
J. E. Hoffman
INVENTORS
Garrett W. Low and
Wm Shakespeare Jr
BY
Phillips Abbott
ATTORNEY (No Model.) 2 Sheets—Sheet 2.
W. SHAKESPEARE, Jr. & G. W. LOW.
PHOTOGRAPHIC CAMERA SHUTTER.

No. 495,066. Patented Apr. 11, 1893.

WITNESSES:
Edward G. Rowbyrd.
J. E. Hoffman.

INVENTORS
William Shakespeare Jr
Garrett W Low
BY
Phillips Abbott
ATTORNEY

THE NORRIS PETERS CO., PHOTO-LITHO., WASHINGTON, D. C.

UNITED STATES PATENT OFFICE.

WILLIAM SHAKESPEARE, JR., AND GARRETT W. LOW, OF KALAMAZOO, MICHIGAN.

PHOTOGRAPHIC-CAMERA SHUTTER.

SPECIFICATION forming part of Letters Patent No. 495,066, dated April 11, 1893.

Application filed May 24, 1892. Serial No. 434,132. (No model.)

*To all whom it may concern:*

Be it known that we, WILLIAM SHAKESPEARE, Jr., and GARRETT W. LOW, citizens of the United States, and residents of Kalamazoo, in the county of Kalamazoo and State of Michigan, have invented certain new and useful Improvements in Photographic Shutters, of which the following is a specification.

Our invention relates to an improvement in photographic shutters and it consists in the construction and arrangement of the parts herein set forth.

Figure 8:
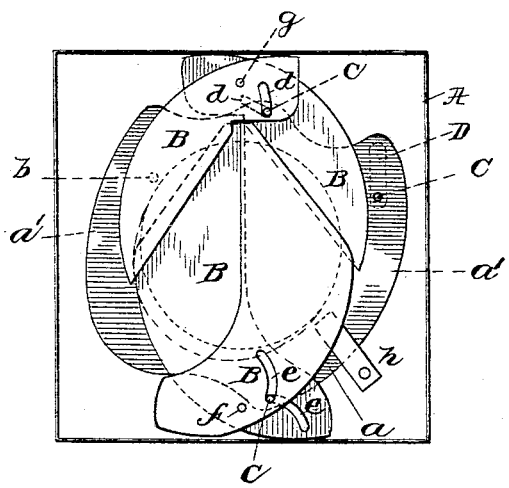
Figure 9:
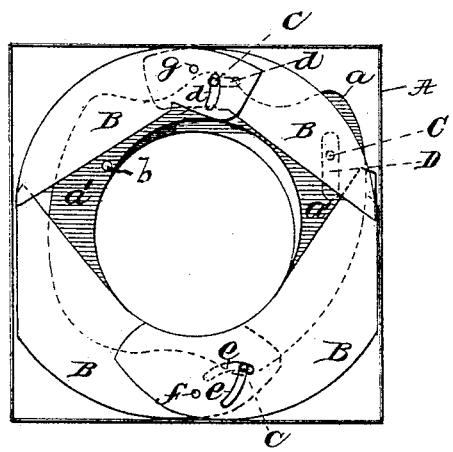

In the drawings, Figure 1, illustrates an elevation of the rear side of the shutter support or case detached from the camera, the parts being shown in their initial position with the shutter wings closed. Fig. 2, illustrates a similar view showing however, the parts in the position which they assume when the motor is about half projected and the operation of flashing the shutter half completed. Fig. 3, shows the position of the parts when the operation of opening and closing the shutter has been performed and the motor is entirely extended. Fig. 4, illustrates the position of the parts during the return of the parts which actuate the shutter, *i. e.*, the motor and its coacting levers to the initial or first position. Fig. 5, illustrates a plan view of the supplemental lever. Fig. 6, illustrates a plan view of the main lever. Fig. 7, illustrates an edgewise view of the supplemental lever in section. Fig. 8, illustrates a view of the opposite side of the shutter from that shown in the other figures the shutter wings being closed. Fig. 9, illustrates a view the same as Fig. 8 but with the shutter wings opened.

A is the back of the shutter support or case; B are the wings thereof; they are or may be of any well known pivoted form.

C is the pin which passes through a slot D in the back of the case of the shutter mechanism if it has a case, and wings B are operated by the movement of the pin C in any known manner, ordinarily by levers or slots in the wings or otherwise, a variety of arrangements and devices are used for this purpose which need not be recited.

E is the motor.

F is the flexible tubing and G is the piston of the motor. This form of motor is one that I prefer, but any suitable form may be employed.

Referring now particularly to Figs. 5, 6 and 7, H is what we call the main lever because it is the one which is fastened to the piston and is also removably pivoted at I to the shutter case. J and K are two pins riveted to the lever H which projecting upwardly pass through slots L and M made in the supplemental lever N as shown in Fig. 5. The pivot I passes through the slot O. At the upper end of the lever H there is a triangular shaped opening P adapted to receive a block Q on the forward end of the supplemental lever N. This block is three cornered and may be fastened in position by a rivet P' or it may be soldered in place. The block is arranged so as to "set-off" from the face of the supplemental lever N and as stated it rests in the triangular recess P in the main lever when the two levers are superposed upon each other as shown. The lower edge of the block is arranged at an angle so that the side R slants in such manner that when the supplemental lever is in its lowermost position the point S of the block rests against a point as at T in the recess in the main lever H, thus leaving at the opposite side of the block Q an opening or angle into which the pin C may enter, see Fig. 3. U is a stop to determine the inward movement of the levers. When the supplemental lever is in position, superposed upon the main lever, it is held in place and both levers are held upon the pivot I by a pin or washer or equivalent device V, which passes through the pivot I.

Referring now to Figs. 8 and 9, the four shutter wings B, B, B, B, are shown. In Fig. 8 they are closed; in Fig. 9 they are opened. The pin C which plays through the slot D made in the case A, connects with a piece of sheet metal $a'$. It is pivoted at $b$ to the case A and on this pivot it oscillates. $c, c$ are two pins set in this oscillating piece of metal which play through slots $d, d$ and $e\ e$ respectively in the shutter wings. The lower pair of wings is pivoted on a pivot $f$ and the upper pair on a pivot $g$. It will be seen that the wings stop by striking against each other and also because their rear ends strike against the sides of the shutter case when closed. $h$ is a guide or stay of the oscillating plate a'. It will be, of course, observed that this oscillating plate a' has a circular opening in it so as not to intercept the passage of the light, and its exterior outline is somewhat irregular as shown. It is given this shape so as to avoid friction between it and the wings as much as may be. It will be seen that the oscillation of the plates a' consequent upon movement of the pin C will cause opening and closing of the shutter wings by the engagement of the pins c c with the slots d d and e e respectively.

The operation is as follows: Upon actuating the motor the outward movement of the piston G rocks both of the levers upon the axis I. During this operation the pin C impinges against the side of the block Q which is fastened to the under side of the supplemental lever N and which rests within the recess P in the main lever and it, the pin, is carried upwardly through the slot D until it reaches the upper end thereof, and thereupon the continued rocking of the levers in the same direction causes the pin C to impinge against the edge of the part a of the cam-like end of the main lever which causes the pin C to return again to the lower portion of the slot D. The upward movement of the pin, as is of course well understood, opens the shutter, and the downward movement of the pin instantly closes it again; thus an "instantaneous" so-called, exposure is made. When the shutter is fully opened and the pin C at the upper part of the slot D, the parts are substantially in the position shown in Fig. 2, and when the pin C has been returned again to the lower portion of the slot D the parts are in substantially the position shown in Fig. 3. Thereupon the bulb (if a bulb be used to actuate the motor) being released the suction thereby created upon the motor will rock the two levers in the reversed direction. Whereupon the pin C enters the angular opening beneath the lower slanting edge of the block Q of the supplemental lever N and as the levers are rocked further in this reversed direction the supplemental lever rises the slots L, O and M, respectively, in it affording space for the pins J, I and K. During this operation the parts assume substantially the position shown in Fig. 4, and after the pin has passed beyond the block Q then the supplemental lever drops under the action of gravity into its primary position and all parts are returned to their normal condition without movement by the shutter.

We claim—

1. The combination in a photographic shutter of a motor, a pin which transmits the movement of the motor to the shutter wings and two pivoted levers, between the motor and the said pin, one, the main lever, connected to the motor, and the other, a supplemental lever, connected with the main lever and adapted to have a rocking movement with it, and also a longitudinal movement independent of it, both of said levers engaging with said pin, substantially as set forth.

2. The combination in a photographic shutter of a motor, a pin which transmits the movement of the motor to the shutter wings, a main lever and a supplemental lever both mounted upon the same axis and both having cam-like surfaces which engage with said pin, the said supplemental lever having its cam surfaces located within a recess in the main lever, whereby during the return of the parts to initial position the supplemental lever may change its position relative to the main lever, substantially as set forth.

3. The combination in a photographic shutter of a motor and two levers pivoted on the same axis, one movable relative to the other, said levers having cam-like surfaces which together constitute a V shaped groove and a pin which transmits the movement of the motor to the shutter wings located in the space between the cam-like surfaces of the said levers and a motor which moves the said levers both at the same time and both in the same direction, substantially as set forth.

Signed at Kalamazoo, in the county of Kalamazoo and State of Michigan, this 21st day of May, A. D. 1892.

WILLIAM SHAKESPEARE, JUNIOR.
GARRETT W. LOW.

Witnesses:
WALLACE F. W. STAFFORD,
WILLIAM SHAKESPEARE.